United States Patent [19]
Cronin et al.

[11] Patent Number: 6,038,504
[45] Date of Patent: Mar. 14, 2000

[54] SYSTEM AND METHOD FOR PROVIDING DIFFERENT VALUES OF JERK IN RESPONSE TO SPEED PEDAL DISPLACEMENT

[75] Inventors: Michael G. Cronin; Brian D. Kuras, both of Peoria; Jerry D. Marr, Metamora, all of Ill.

[73] Assignee: Caterpillar Inc., Peoria, Ill.

[21] Appl. No.: 09/059,637

[22] Filed: Apr. 13, 1998

[51] Int. Cl.[7] .................................................. B60K 41/12
[52] U.S. Cl. .............................. 701/51; 701/55; 701/58
[58] Field of Search .................................. 701/51, 53, 54, 701/55, 58, 60, 61

[56] References Cited

U.S. PATENT DOCUMENTS

| | | | |
|---|---|---|---|
| 5,495,158 | 2/1996 | Schmidt et al. | 318/561 |
| 5,508,596 | 4/1996 | Olsen | 318/567 |
| 5,553,453 | 9/1996 | Coutant et al. | 60/327 |
| 5,636,119 | 6/1997 | Coutant et al. | 701/51 |
| 5,638,267 | 6/1997 | Singhose et al. | 700/28 |

*Primary Examiner*—William A. Cuchlinski, Jr.
*Assistant Examiner*—Edward Pipala
*Attorney, Agent, or Firm*—Kevin M. Kercher

[57] ABSTRACT

A system and process for providing different levels of jerk in response to speed pedal displacement in a machine including a speed pedal having a range of displacement, a continuously variable transmission, a mechanism for measuring output speed of the continuously variable transmission, and an electronic controller for generating a jerk command signal that is in a one-to-one correspondence with the displacement of the speed pedal and shaping the jerk command signal into a velocity profile command that is applied to the continuously variable transmission and then comparing the output speed of the continuously variable transmission with the velocity profile command for controlling the continuously variable transmission.

20 Claims, 6 Drawing Sheets

SPEED (VELOCITY) PEDAL

Fig_6_

Fig. 8
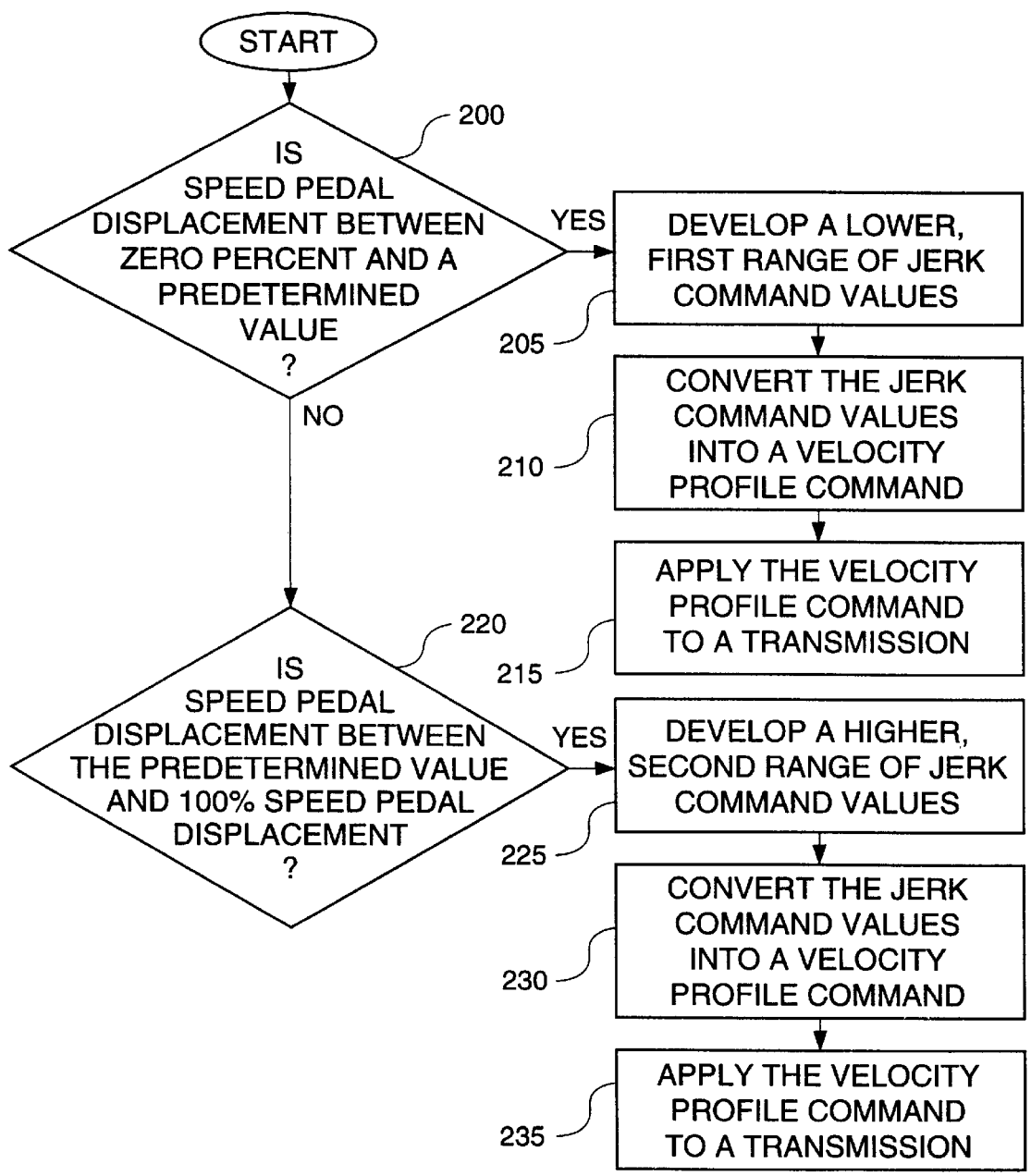

SYSTEM AND METHOD FOR PROVIDING DIFFERENT VALUES OF JERK IN RESPONSE TO SPEED PEDAL DISPLACEMENT

TECHNICAL FIELD

This invention relates generally to a selective application of jerk to a machine and more particularly to a method providing different values and levels of jerk commands in response to an amount of speed pedal displacement.

BACKGROUND ART

Typically, machine velocity control schemes utilize the reading of a speed pedal's displacement to create a jerk command. Jerk is defined as the second derivative of velocity and the first derivative of acceleration. A high jerk value provides aggressive machine operation, however, it could cause the operator to lose control due to the rapid movement of the machine by creating unwanted speed pedal modulation. On the other hand, a low jerk value will provide time for the operator to react to unwanted speed pedal modulation. However, it can result in a relatively sluggish operation. The application of jerk has a linear, zero slope so that the amount of jerk was constant throughout the full range of pedal displacement. Since this constant jerk value is a compromise that attempts to prevent either an overall sluggish operation or too much unwanted speed pedal modulation. Unfortunately, this results in too much jerk being present when the operator desires a greater degree of control and not enough jerk being present when the operator desires quick machine response.

The subject invention is directed to overcoming one or more of the problems as set forth above.

DISCLOSURE OF THE INVENTION

In one aspect of the present invention, a system for providing different levels of jerk in response to speed pedal displacement in a machine is disclosed. The system includes a continuously variable transmission, a mechanism for measuring output speed of the continuously variable transmission, and an electronic controller for generating a jerk command signal that is in a one-to-one correspondence with the displacement of the speed pedal and shaping this jerk command signal into a velocity profile command that is then applied to the continuously variable transmission. The output speed of the continuously variable transmission is then compared with the commanded velocity profile for controlling the continuously variable transmission.

In another aspect of the present invention, a process for providing different levels of jerk in response to speed pedal displacement in a machine, is disclosed. The process includes the following steps. Generating a jerk command signal that is in a one-to-one correspondence with the speed pedal displacement, shaping this jerk command signal into a velocity profile command that is applied to the continuously variable transmission, and then comparing the output speed of the continuously variable transmission with the commanded velocity profile for controlling the continuously variable transmission.

BRIEF DESCRIPTION FOR THE DRAWINGS

For a better understanding of the present invention, reference may be made to the accompanying drawings in which:

FIG. 8 is a flowchart of an alternative embodiment illustrating software for developing two ranges of jerk command values that are correlated to speed pedal displacement.

BEST MODE FOR CARRYING OUT THE INVENTION

Figure 1:
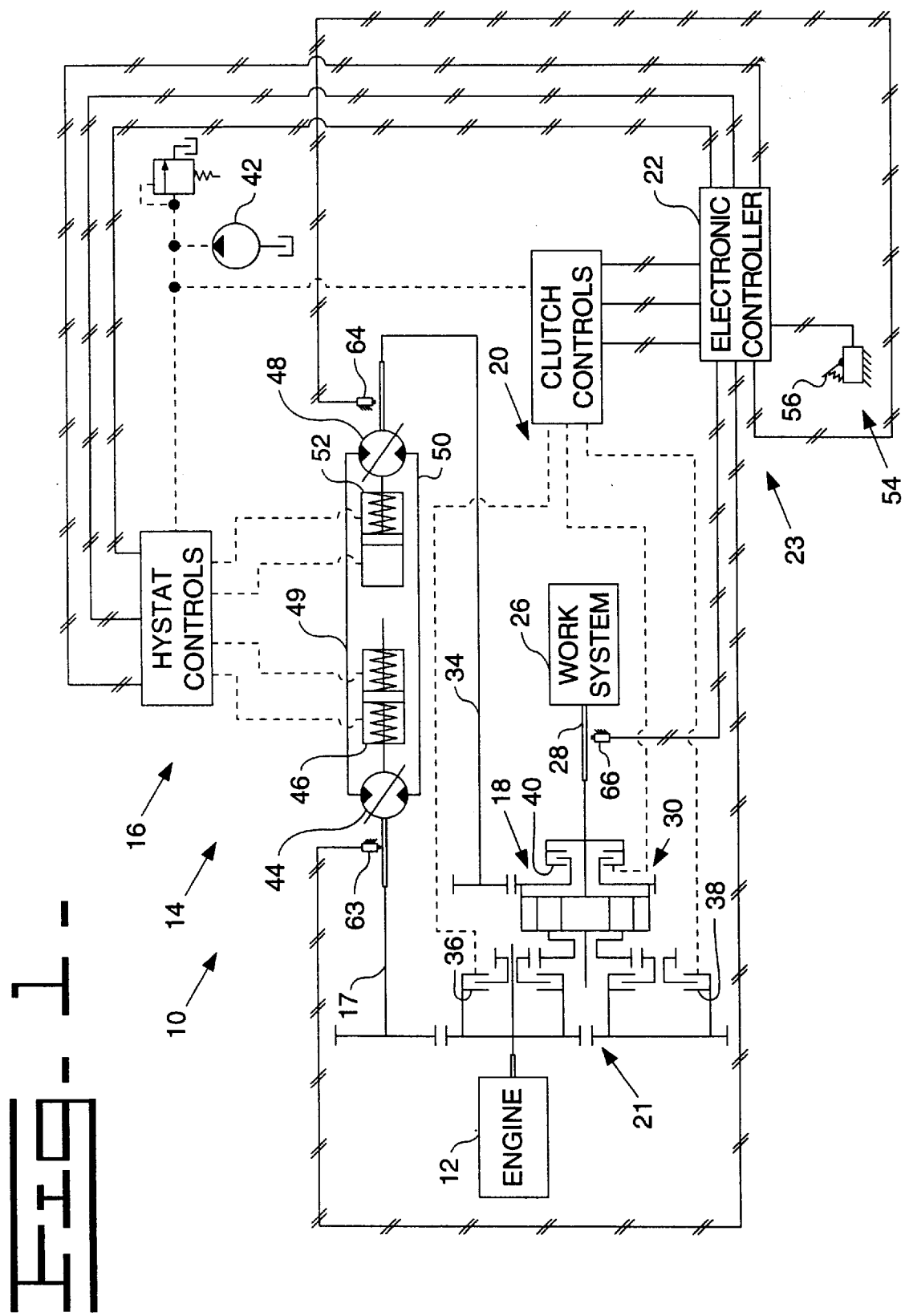
FIG. 1 is a combination schematic and diagrammatic illustration of a machine system which utilizes the subject invention.

Referring to FIG. 1 of the drawings, a continuously variable transmission 10 is illustrated for use on a machine (not shown) having an engine 12. The continuously variable transmission 10 includes a hydrostatic transmission 14 and its associated hystat control arrangement 16 operatively connected to the engine 12 through a pump input drive shaft 17, a mechanical transmission 18 and its associated clutch control arrangement 20 operatively connected to the engine 12 through a gear arrangement 21, an electronic controller 22 operatively connected to the hystat control arrangement 16 of the hydrostatic transmission 14 and the clutch control arrangement 20 of the mechanical transmission 18. The electronic controller 22 is preferably a microprocessor, but any of a wide variety of programmable computing devices will suffice. A work system 26 is connected to the continuously variable transmission 10 by a final drive shaft 28.

The mechanical transmission 18 includes a summing planetary arrangement 30 operatively connected to both the engine 12 through the gear arrangement 21 and to the hydrostatic transmission 14 through a motor output shaft 34. The output of the summing planetary arrangement 30 is connected to the final drive shaft 28.

The mechanical transmission 18 also includes directional and high speed clutches 36, 38 and a low speed clutch 40. The clutch control arrangement 20 is connected to a source of pressurized pilot fluid, such as a pilot pump 42 and the electronic controller 22 and operative in response to receipt of electrical signals from the electronic controller 22 to control engagement and disengagement of the respective speed clutches 36, 38, and 40.

The hydrostatic transmission 14 includes a variable displacement pump 44, a pump displacement controller 46, a variable displacement motor 48 fluidly connected to the variable displacement pump 44 by conduits 49 and 50, and a motor displacement controller 52. The hystat control arrangement 16 is connected to the pilot pump 42 and the electronic controller 22 and operative in response to receipt of electrical signals from the electronic controller 22 to control movement of the respective pump and motor displacement controllers 46 and 52.

The command input arrangement 24 includes a speed input mechanism 54 having a speed pedal 56. The speed pedal 56 is movable from a maximum speed position to a zero speed position.

The sensing arrangement 23 includes a first speed sensor 63 operative to sense the speed of the pump input shaft 17 and direct an electrical signal representative thereof to the electronic controller 22. A second speed sensor 64 is operative to sense the speed of the motor output shaft 34 and direct an electrical signal representative thereof to the electronic controller 22. A third speed sensor 66 is operative to sense the speed of the final drive shaft 28 and direct an electrical signal representative thereof to the electronic controller 22.

The above description of the hydrostatic transmission 14 is merely illustrative and nonlimiting and this invention is not specifically limited to this specific hydrostatic controlling device. All known continuously variable transmissions that are actively controlled will suffice.

Figure 2:
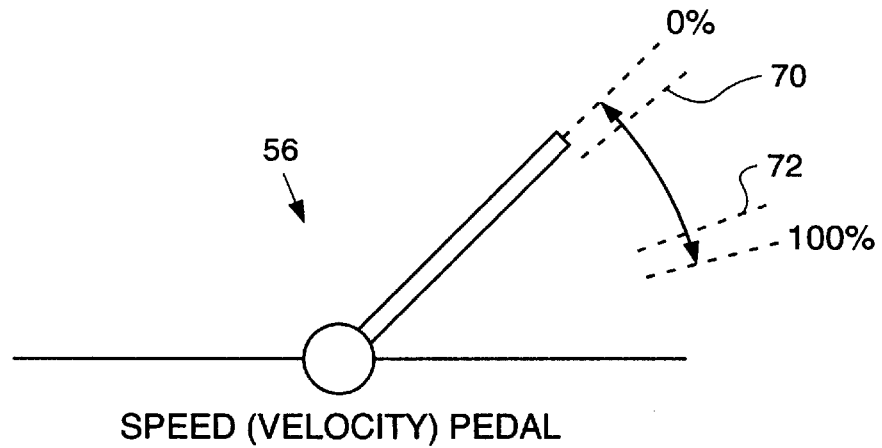
FIG. 2 is a diagrammatic illustration of a speed pedal with a full range of displacement.

Referring to FIG. 2, a diagram of speed pedal 56 is depicted having a range of displacement between zero percent (0%) to one hundred percent (100%). There are two predetermined points between zero percent (0%) and one hundred percent (100%) that are referenced by numerals 70 and 72, respectively.

Figure 3:
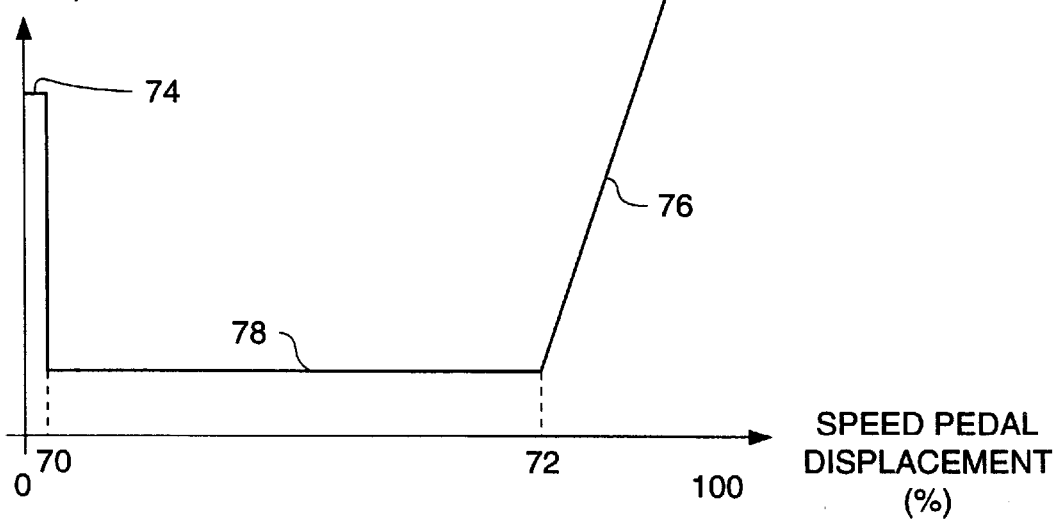
FIG. 3 is a control map of the present invention illustrating the relationship between jerk and speed pedal displacement.

Referring to FIG. 3, jerk is defined as the first derivative of acceleration and the second derivative of velocity. A high degree of jerk can provide an aggressive machine response for the operator but could lessen the degree of control that the operator has over the machine. This would be due to the rapid change in machine velocity and the potential for unwanted speed pedal 56 modulation. On the other hand, a low degree of jerk will allow the operator time to react to unwanted speed pedal 56 modulation and allow the operator to have a high degree of control over the machine. At times, however, this can provide a relatively sluggish response. An object of this invention is to provide the optimal amount of jerk at the appropriate time. Therefore, when the speed pedal displacement is zero percent and greater but less than a first predetermined speed pedal displacement, identified as numeral 70 in FIGS. 2 and 3, a relatively high value for a jerk command, identified by numeral 74, will be generated by the electronic controller 22. This is because when the operator has either his or her foot off the speed pedal 56 or nearly off the speed pedal 56, a high degree of jerk is desired to bring the machine to a stop as soon as possible. This first predetermined speed pedal displacement can be as high as ten percent and is preferably five percent.

When the speed pedal displacement is equal to or greater than a second predetermined speed pedal displacement up to and including one hundred percent (100%), identified as numeral 72 in FIGS. 2 and 3, a relatively high value for a jerk command, identified by numeral 76, will also be generated by the electronic controller 22. This is because when the operator has either totally depressed or substantially depressed the speed pedal 56, a high degree of jerk is desired to accelerate the machine as fast as possible. This second predetermined speed pedal displacement can be as low as seventy percent and is preferably ninety-five percent.

For the range equal to and greater than the first predetermined level up to but less than the second predetermined level, a relatively low value for a jerk command, identified by numeral 78, will be generated by the electronic controller 22. This is because throughout this range, the operator requires a high degree of operational control without either rapid acceleration or deceleration.

The electronic controller 22 generates a jerk command in a one-to-one correspondence to speed pedal displacement value. Preferably, a look-up table is utilized, however, any of a wide variety of memory storage devices may be utilized.

Figure 4:
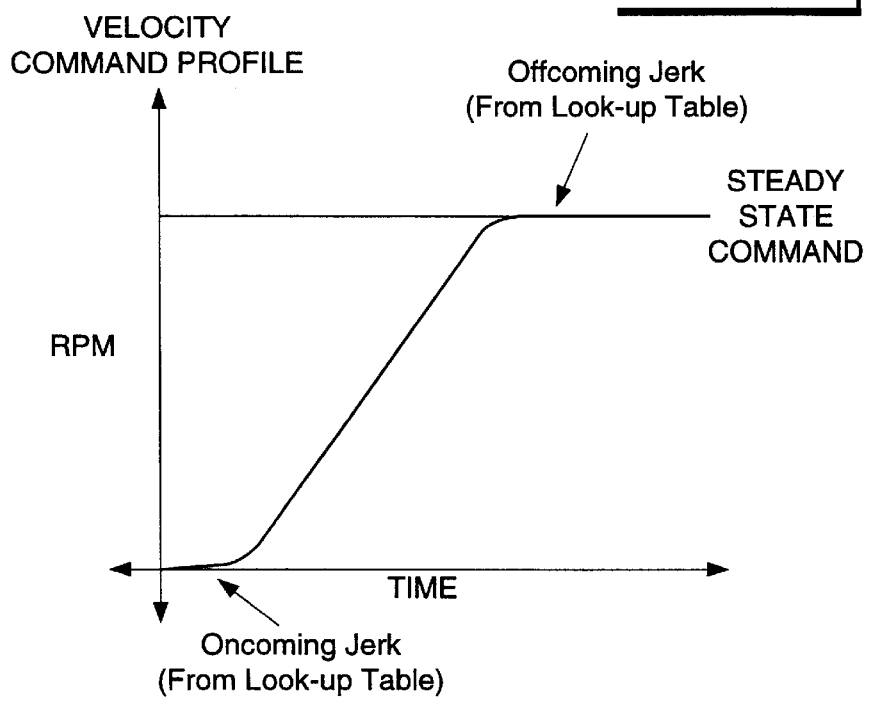
FIG. 4 is a control map of the velocity command profile that is developed from oncoming and offgoing values of jerk as a function of revolutions per minute of a continuously variable transmission versus time.

Referring to FIG. 4, at least two jerk command signals are shaped by the electronic controller 22 into a velocity profile command that is applied to the continuously variable transmission 10. The velocity profile command is applied to the hystat controls 16. The electronic controller then performs a closed loop PID control in order to match the velocity profile command with the output from the second speed sensor 64 that is operative to sense the speed from the motor output shaft 34.

Figure 5:
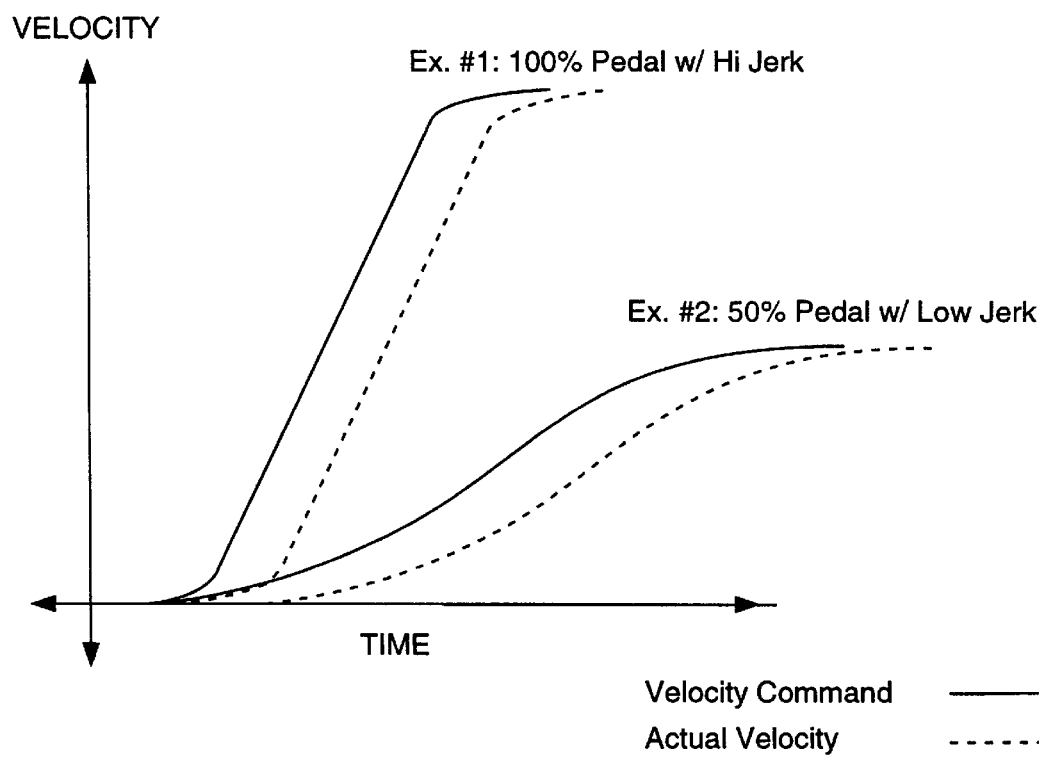
FIG. 5 is a control map illustrating the relationship between velocity and time for both one hundred percent (100%) speed pedal displacement and fifty percent (50%) speed pedal displacement.

Referring to FIG. 5, at one hundred percent (100%) speed pedal displacement, a relatively high value for a jerk command is present. This generates a relatively high acceleration and velocity in a short period of time. There is a significant lag between the applied velocity and actual velocity. This presents a stark contrast to fifty percent (50%) speed pedal displacement, having a relatively low value of jerk. This generates a relatively low acceleration and velocity over a longer period of time. The lag between the applied velocity and actual velocity is much less with the machine being under a greater degree of control.

The software will now be discussed with reference to FIGS. 6, 7, and 8, which depict flowcharts representative of the computer program instructions executed by the electronic controller 22 that receives input from speed input mechanism 54 and applies a velocity profile command to the continuously variable transmission 10, as shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number.

Figure 6:
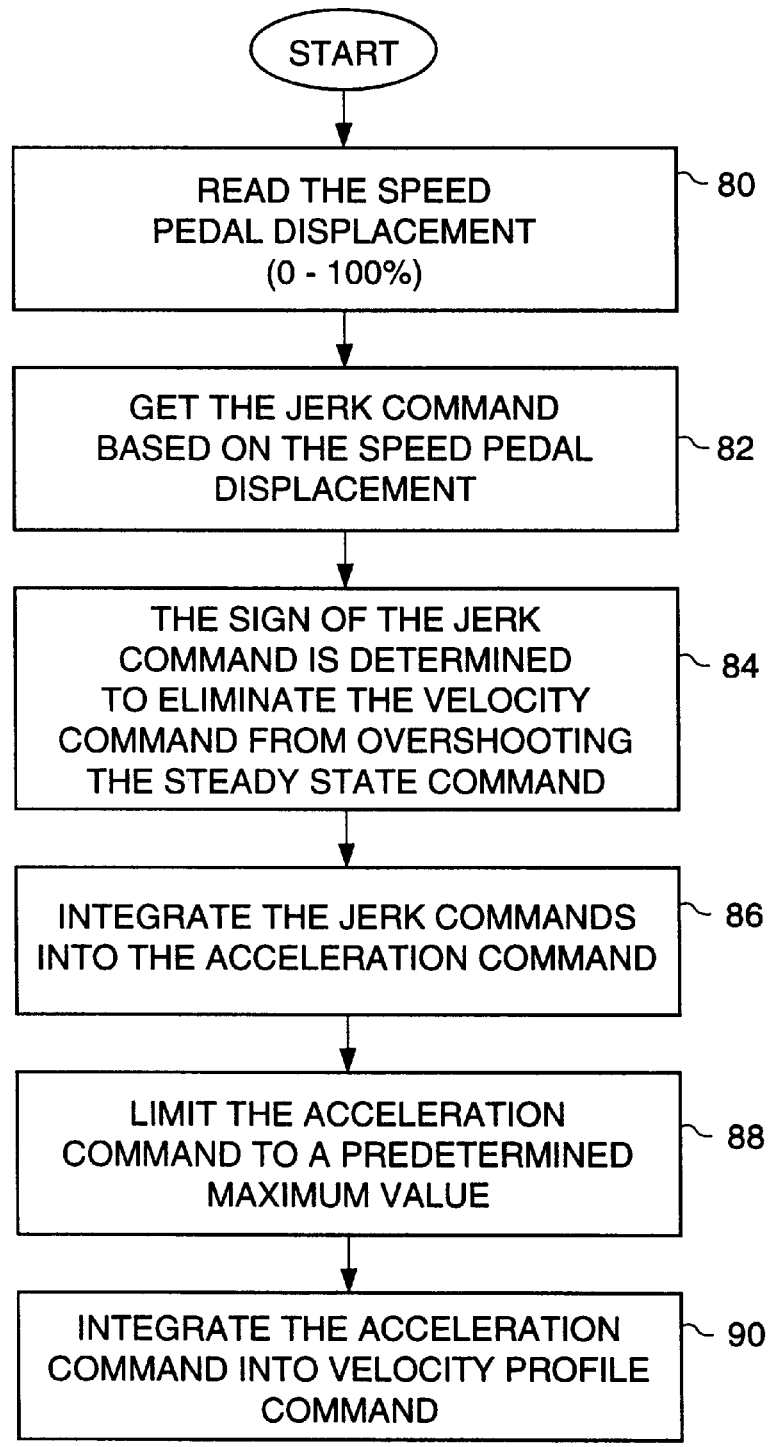
FIG. 6 is a flowchart illustrating software for converting values of speed pedal displacement into a velocity profile command.

The conversion program from a speed pedal 56 displacement reading to a velocity profile command is detailed in FIG. 6. The first step is to obtain a reading of the speed pedal displacement between zero percent (0%) to one hundred percent(100%) <80>. The second step is to obtain, in one-to-one correspondence, a jerk command value based on this speed pedal value. This is preferably from a look-up table <82>. The third step is to determine the sign of the jerk command so that the jerk command will not overshoot the steady-state command shown in FIG. 4 <84>. The fourth step integrates the value of the jerk command into an acceleration command <86>. The fifth step limits the acceleration command to a predetermined maximum value. A maximum value can extend up to 0.7 G's with a preferred value being about 0.4 G's <88>. The sixth and final step integrates the acceleration command to form a velocity profile command <90>.

Figure 7:
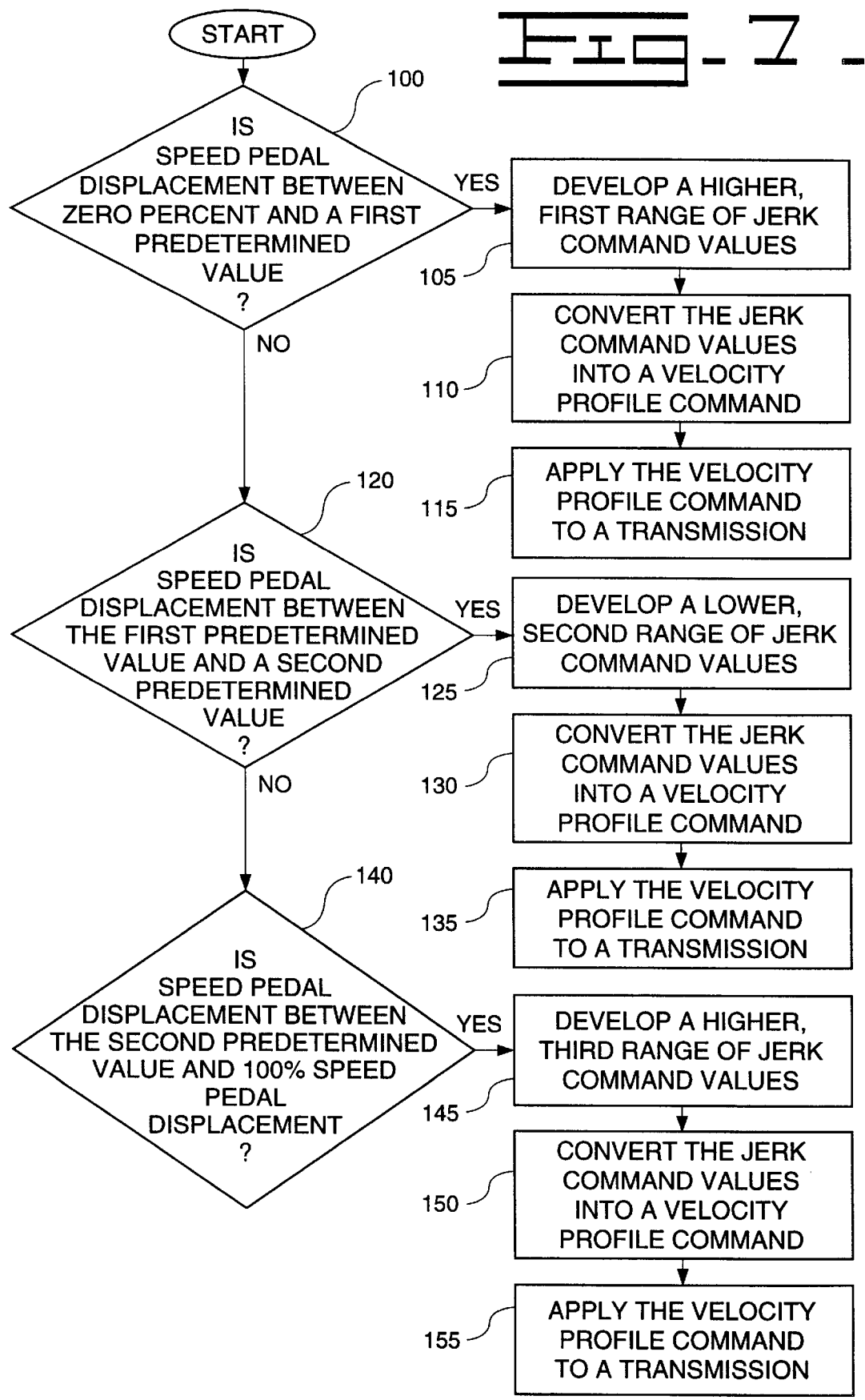
FIG. 7 is a flowchart illustrating software for developing three ranges of jerk command values that are correlated to speed pedal displacement.

FIG. 7 depicts the preferred embodiment of the present invention. The detailed steps of converting speed pedal displacement into a velocity profile command of FIG. 6, are abridged for simplicity and clarity. The program first determines from the speed input mechanism 54 whether the speed pedal displacement is in a first range of zero percent and greater but less than a first predetermined value <100>. This first range can be from about zero percent (0%) to about ten percent (10%) and preferably ranges from about zero percent (0%) to about five percent (5%). If the answer is yes, a look-up table will provide a dependent jerk command value based on the independent value of speed pedal displacement <105>. The jerk command values are then shaped into a velocity profile command <110>. This velocity profile command is then applied to the continuously variable transmission 10 and then the actual output velocity and commanded velocity profile of the continuously variable transmission 10 are matched under closed-loop PID control <115>.

If the displacement of the speed pedal 56 is in a second range that is equal or greater than the first predetermined value and less than a second predetermined value, as determined from the speed input mechanism 54, then the software goes directly from program step <100>to program step <120>. This second range can be from about ten percent (10%) to about seventy percent (70%) and preferably ranges from about five percent (5%) to about ninety-five percent (95%). If the answer is yes, a look-up table will provide a dependent jerk command value based on the independent value of speed pedal displacement <125>. The jerk command values are then shaped into a velocity profile command <130>. This velocity profile command is then applied to the continuously variable transmission 10 and then the actual output velocity and commanded velocity profile of the continuously variable transmission 10 are matched under closed-loop PID control <135>.

If the displacement of the speed pedal 56 is in a third range that is equal to or greater than the second predetermined value up to and including one hundred percent (100%), as determined from the speed input mechanism 54, then the software will bypass program steps <100>and <120>and go directly to program step <140>. This third range can be from about seventy percent (70%) to about one hundred percent (100%) and preferably ranges from about ninety-five percent (95%) to about one hundred percent (100%). If the answer is yes, a look-up table will provide a dependent jerk command value based on the independent value of speed pedal displacement <145>. The jerk command values are then converted into a velocity profile command <150>. This velocity profile command is then applied to the continuously variable transmission 10 and then the actual output velocity and commanded velocity profile of the continuously variable transmission 10 are matched under closed-loop PID control <155>.

On the average, the jerk command values for the first range and the third range will be higher than that of the second range. Jerk in the first and third range will extend from about 0.3 to about 2 G's per second and preferably from about 0.5 to about 1 G's per second. Jerk in the second range will extend from about 0.05 to about 0.3 G's per second and preferably from about 0.1 to about 0.2 G's per second.

As an alternative, nonpreferred embodiment, this invention can function with only two ranges. Once again, the detailed steps of converting speed pedal displacement into a velocity profile command shown in FIG. 6 are abridged for simplicity and clarity. As shown in FIG. 8, the program first determines from the speed input mechanism 54 whether the speed pedal displacement is in a first range of zero percent or greater but less than a first predetermined value <200>. This first range can be from about zero percent (0%) to about seventy percent (70%) and preferably ranges from about zero percent (0%) to about ninety-five percent (95%). If the answer is yes, a look-up table will provide a dependent jerk command value based on the independent value of speed pedal displacement <205>. The jerk command values are then shaped into a velocity profile command <210>. This velocity profile command is then applied to the continuously variable transmission 10 and then the actual output velocity and commanded velocity of the continuously variable transmission 10 are matched under closed-loop PID control <215>.

If the displacement of the speed pedal 56 is in a second range that is equal to or greater than the first predetermined value up to and including one hundred percent (100%) speed pedal displacement, as determined from the speed input mechanism 54, then the software goes directly from program step <200>to program step <220>. This second range can be from about seventy percent (70%) to about one hundred percent (100%) and preferably ranges from about ninety-five percent (95%) to about one hundred percent (100%). If the answer is yes, a look-up table will provide a dependent jerk command value based on the independent value of speed pedal displacement <225>. The jerk command values are then shaped into a velocity profile command <230>. This velocity profile command is then applied to the continuously variable transmission 10 and then the actual output velocity and commanded velocity profile of the continuously variable transmission 10 are matched under closed-loop PID control <235>.

Jerk in the first range will extend from about 0.05 to about 0.3 G's per second and preferably from about 0.1 to about 0.2 G's per second. Jerk in the second range will extend from about 0.3 to about 2 G's per second and preferably from about 0.5 to about 1 G's per second.

INDUSTRIAL APPLICABILITY

In the operation of the subject embodiment, a speed pedal 56 is displaced in a range of zero to one hundred percent by the operator of a machine. The speed pedal 56 generates a proportional signal through the attached speed input mechanism 54. This proportional signal is applied to the electronic controller 22. Relatively high values of jerk will be generated by the electronic controller when the operator displaces the speed pedal in a first range of zero percent and greater up to but less than a first predetermined level and when the operator displaces the speed pedal in a third range between a second predetermined value and greater up to and including one hundred percent speed pedal displacement. This is to provide a relatively high amount of jerk when the speed pedal is near zero and the operator is trying to stop the machine as well as when the speed pedal is near full displacement when the operator wants a relatively high amount of jerk, thus wanting an aggressive machine. The second, middle range includes the first predetermined speed pedal displacement value and greater up, to but less than the second predetermined speed pedal displacement value. This is where the operator prefers smooth, even control without extreme values of jerk. The first predetermined level can be as high as ten percent (10%) and is preferably five percent (5%). The second predetermined level can be as low as seventy percent (70%) and is preferably ninety-five percent (95%).

As an alternative embodiment, this invention will function with only two ranges. Relatively low values of jerk will be generated by the electronic controller in response to the range where the operator displaces the speed pedal in a first range of zero percent and greater up to but less than a first predetermined level. This is to provide a relatively low amount of jerk when the operator prefers smooth, even control without extreme values of jerk. The second range is from the first predetermined speed pedal displacement value and goes up to and includes the one hundred percent (100%) speed pedal displacement value. This is where the operator prefers extreme values of jerk to make the machine respond as fast as possible. This second predetermined level can be as low as seventy percent (70%) and is preferably ninety-five percent (95%).

The object of the present invention is to provide a relatively high level of jerk when either maximum acceleration or deceleration is desired quickly and a relatively low level of jerk for all points in between to maximize the smoothness of the operator's control of the machine. This results in improved machine performance.

In view of the foregoing, it is readily apparent the subject system and method provides a process for providing different ranges of jerk commands depending on the displacement of the speed pedal in a machine having a continuously variable transmission with closed loop control to enable the operator to control the machine to a greater degree.

Other aspects, objects and advantages of the invention can be obtained from a study of drawings, the disclosure and the appended claims.

We claim:

1. A system for providing different levels of jerk in response to speed pedal displacement in a machine comprising:

a speed pedal having a range of displacement;

a continuously variable transmission;

a mechanism for measuring output speed of the continuously variable transmission; and an electronic controller for generating a a jerk command signal that is in a one-to-one correspondence with the displacement of the speed pedal and shaping the jerk command signal into a velocity profile command that is applied to the continuously variable transmission and comparing the output speed of the continuously variable transmission with the velocity profile command for controlling the continuously variable transmission.

2. The system of claim 1, wherein the electronic controller for generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the second range of jerk command values are, on the average, higher than the first range of jerk command values.

3. The system of claim 1, wherein the electronic controller for generating a jerk command signal that is in a one-to-one correspondence with the displacement of the speed pedal includes generating a first range of jerk command values when the speed pedal displacement is at zero percent displacement and greater but less than seventy percent speed pedal displacement and a second range of jerk command values when the speed pedal displacement is at seventy percent speed pedal displacement and greater up to and including one hundred percent speed pedal displacement wherein the second range of jerk command values are, on the average, higher than the first range of jerk command values.

4. The system of claim 1, wherein the electronic controller for generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the first range of jerk command values is between 0.05 to 0.3 G's per second and the second range of jerk command values is between 0.3 to 2 G's per second.

5. The system of claim 1, wherein the electronic controller for generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the first range of jerk command values is between 0.1 to 0.2 G's per second and the second range of jerk command values is between 0.5 to 1 G's per second.

6. The system of claim 1, wherein the electronic controller for the generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement and a third range of jerk command values when the speed pedal displacement is at the second predetermined speed pedal displacement and greater up to and including one hundred percent speed pedal displacement wherein the first range of jerk command values and the third range of jerk command values are, on the average, higher than the second range of jerk command values.

7. The system of claim 1, wherein the electronic controller for the generating a jerk command signal that is in a one-to-one correspondence with the displacement of the speed pedal includes generating a first range of jerk command values when the speed pedal displacement is at zero percent displacement and greater but less than ten percent speed pedal displacement and a second range of jerk command values when the speed pedal displacement is at ten percent pedal displacement and greater but less than seventy percent speed pedal displacement and a third range of jerk command values when the speed pedal displacement is at seventy percent speed pedal displacement and greater up to and including one hundred percent speed pedal displacement wherein the first range of jerk command values and the third range of jerk command values are, on the average, higher than the second range of jerk command values.

8. The system of claim 1, wherein the electronic controller for the generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement and a third range of jerk command values when the speed pedal displacement is at the second predetermined speed pedal displacement and greater up to and including one hundred percent speed pedal displacement wherein the first range of jerk command values and the third range of jerk command values are between 0.3 to 2 G's per second and the second range of jerk command values is between 0.05 to 0.3 G's per second.

9. The system of claim 1, wherein the electronic controller for the generating a jerk command signal that is in a one-to-one correspondence with the displacement of the speed pedal includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement and a third range of jerk command values when the speed pedal displacement is at the second predetermined speed pedal displacement and greater up to and including one hundred percent speed pedal displacement wherein the first range of jerk command values and the third range of jerk command values are between 0.5 to 1 G's per second and the second range of jerk command values is between 0.1 to 0.2 G's per second.

10. A method for providing different levels of jerk in response to speed pedal displacement in a machine having a continuously variable transmission with a closed loop control, comprising the steps of:
generating a jerk command signal that is in a one-to-one correspondence with the speed pedal displacement;
shaping the jerk command signal into a velocity profile command that is applied to the continuously variable transmission; and
comparing the output speed of the continuously variable transmission with the velocity profile command for controlling the continuously variable transmission.

11. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the second range of jerk command values is, on the average, higher than the first range of jerk command values.

12. The method of claim 10, wherein the step of generating a jerk command signal that is in a one-to-one correspondence with the speed pedal displacement includes generating a first range of jerk command values when the speed pedal displacement is at zero percent displacement and greater but less than seventy percent speed pedal displacement and a second range of jerk command values when the speed pedal displacement is at seventy percent speed pedal displacement and greater up to and including one hundred percent speed pedal displacement wherein the second range of jerk command values is, on the average, higher than the first range of jerk command values.

13. The method of claim 10, wherein the step of generating a jerk command signal that is in a one-to-one correspondence with the speed pedal displacement includes generating a first range of jerk command values when the speed pedal displacement is at zero percent displacement and greater but less than ninety-five percent speed pedal displacement and a second range of jerk command values when the speed pedal displacement is at ninety-five percent speed pedal displacement and greater up to and including one hundred percent speed pedal displacement wherein the second range of jerk command values is, on the average, higher than the first range of jerk command values.

14. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the first range of jerk command values is between 0.05 to 0.3 G's per second and the second range of jerk command values is between 0.3 to 2 G's per second.

15. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater up to and including one hundred percent speed pedal displacement wherein the first range of jerk command values is between 0.1 to 0.2 G's per second and the second range of jerk command values is between 0.5 to 1 G's per second.

16. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement value and a third range of jerk command values when the speed pedal displacement is at the second predetermined speed pedal displacement and greater up to and including one hundred percent speed pedal displacement wherein the first range of jerk command values and the third range of jerk command values are, on the average, higher than the second range of jerk command values.

17. The method of claim 10, wherein the step of generating a jerk command signal that is in a one-to-one correspondence with the speed pedal displacement includes generating a first range of jerk command values when the speed pedal displacement is at zero percent displacement and greater but less than ten percent speed pedal displacement and a second range of jerk command values when the speed pedal displacement is at ten percent speed pedal displacement and greater but less than seventy percent speed pedal displacement value and a third range of jerk command values when the speed pedal displacement is at seventy percent speed pedal displacement and greater up to and including one hundred percent speed pedal displacement wherein the first range of jerk command values and the third range of jerk command values are, on the average, higher than the second range of jerk command values.

18. The method of claim 10, wherein the step of generating a jerk command signal that is in a one-to-one correspondence with the speed pedal displacement includes generating a first range of jerk command values when the speed pedal displacement at zero percent displacement and greater but less than five percent speed pedal displacement and a second range of jerk command values when the speed pedal displacement is at five percent speed pedal displacement and greater but less than ninety-five percent speed pedal displacement value and a third range of jerk command values when the speed pedal displacement is at ninety-five percent speed pedal displacement and greater up to and including one hundred percent speed pedal displacement wherein the first range of jerk command values and the third range of jerk command values are, on the average, higher than the second range of jerk command values.

19. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement value and a third range of jerk command values when the speed pedal displacement is at the second predetermined speed pedal displacement and greater up to and including one hundred percent speed pedal displacement wherein the first range of jerk command values and the third range of jerk command values are between 0.3 to 2 G's per second and the second range of jerk command values is between 0.05 to 0.3 G's per second.

20. The method of claim 10, wherein the step of generating a jerk command signal that is in a one-to-one correspondence with the speed pedal displacement includes generating a first range of jerk command values when the speed pedal displacement is at zero percent displacement and greater but less than a first predetermined speed pedal displacement and a second range of jerk command values when the speed pedal displacement is at the first predetermined speed pedal displacement and greater but less than a second predetermined speed pedal displacement value and a third range of jerk command values when the speed pedal displacement is at the second predetermined speed pedal displacement and greater up to and including one hundred percent speed pedal displacement wherein the first range of jerk command values and the third range of jerk command values are between 0.5 to 1 G's per second and the second range of jerk command values is between 0.1 to 0.2 G's per second.

* * * * *